United States Patent [19]

Beisemann

[11] 3,770,022

[45] Nov. 6, 1973

[54] SUPPORT DEVICES FOR ELONGATE MEMBERS

[75] Inventor: Heinz Beisemann, Monchengladbach, Germany

[73] Assignee: P. Konings Machinefabriek, Ijzeren Metaal-Gieterij N.V., Swalmen, Netherlands

[22] Filed: Oct. 6, 1970

[21] Appl. No.: 78,475

[30] Foreign Application Priority Data

July 31, 1970 Germany.................. P 20 38 147.9

[52] U.S. Cl..................... 138/108, 248/51, 312/268
[51] Int. Cl............................................. F16l 55/00
[58] Field of Search..... 138/103–110; 198/DIG. 2; 248/49, 51; 312/91, 97.1, 268; 59/78.1

[56] References Cited
UNITED STATES PATENTS

| | | | |
|---|---|---|---|
| 1,274,715 | 8/1918 | Hook et al........................... | 138/105 |
| 1,845,836 | 2/1932 | Hauser............................... | 138/106 |
| 2,975,807 | 3/1961 | Waninger........................... | 138/108 |
| 3,197,954 | 8/1965 | Merker et al...................... | 138/108 |
| 3,443,601 | 5/1969 | Siegwart............................ | 138/107 |

FOREIGN PATENTS OR APPLICATIONS 781,153  2/1935  France............................ 138/108

461,335  6/1951  Italy................................... 138/105

*Primary Examiner*—Houston S. Bell, Jr.
*Attorney*—Herbert E. Kidder

[57] ABSTRACT

A support device for running at least one flexible elongate member, such as a cable, pipe or the like, from a fixed station to a station movable with respect to the fixed station provides an open-ended loop region between the fixed and movable stations. It includes a guide strip defining a path for the member. The relaxed cross-section of the guide strip has a curved profile providing longitudinal stiffening to resist bending of the strip away from its longitudinal axis. The strip is elastically deformable, however, to assume a flattened cross-section in the loop region. In an open form of device, the elongate members are held on to the strip by spaced clips or elastic bands. In a closed form of device the elongate members are held in a space between the guide strip and an auxiliary guide strip running along it. In this closed form, seals may be provided along the mating edges of the strips, and spacers may be included in the member-receiving space between the strips for locating the member or members. A drum may be arranged to lie loosely in the loop. The guide strip may be arcuate or undulant in cross section.

7 Claims, 26 Drawing Figures

PATENTED NOV 6 1973 3,770,022

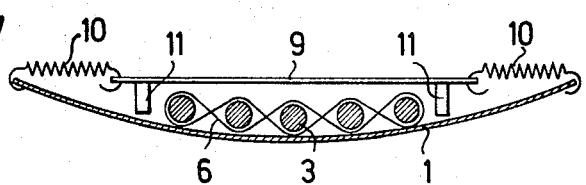
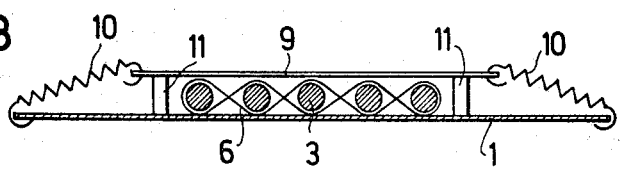
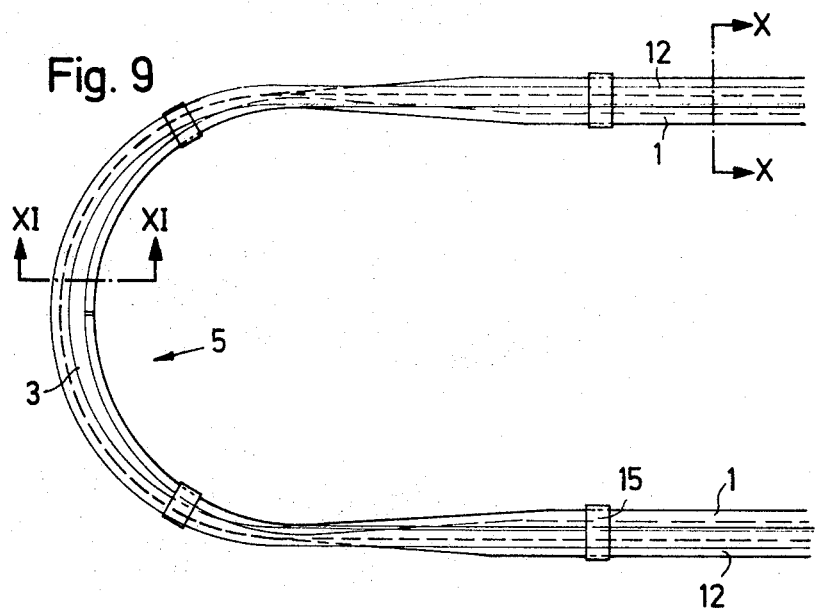
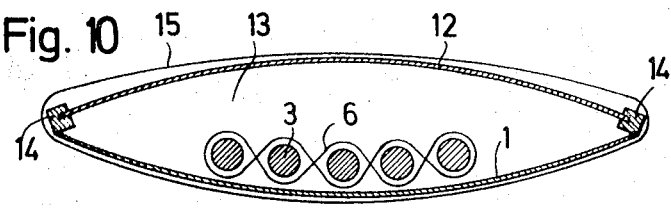

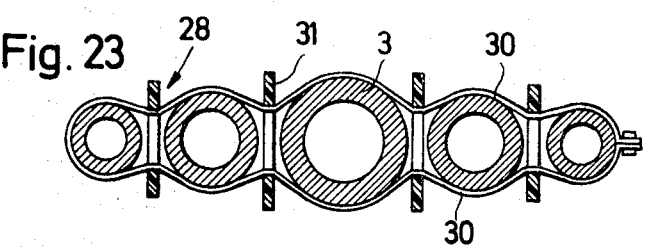
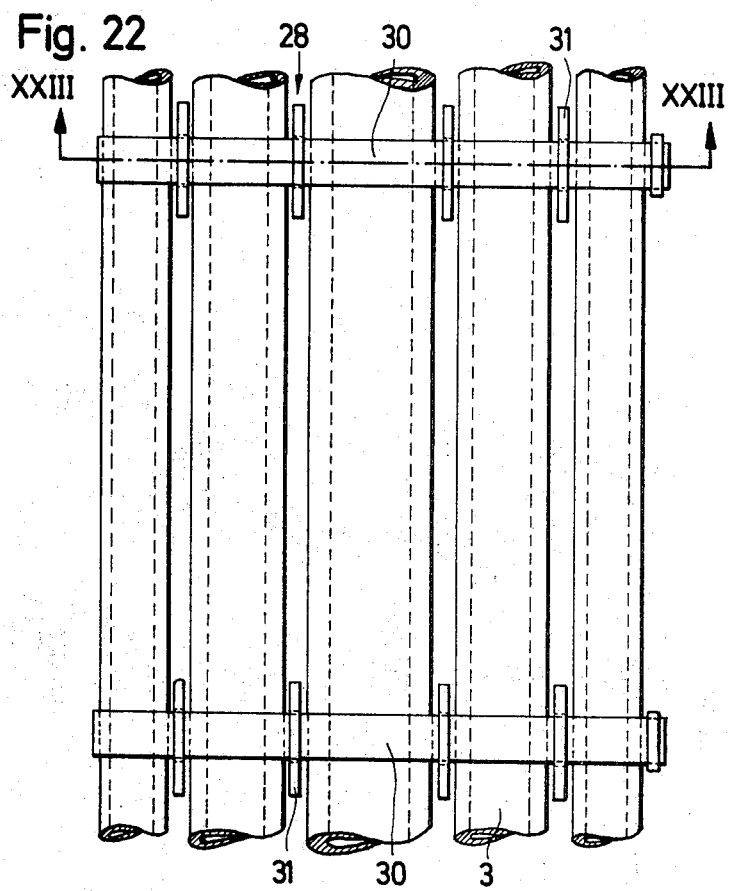

SUPPORT DEVICES FOR ELONGATE MEMBERS

The invention relates to a device for guiding flexible cables or hoses from a fixed point of connection to a movable consumer, comprising a carrying strip of a material of high elasticity and strength, preferably of spring steel or plastic, which has one extremity stationarily arranged and the other extremity arranged with formation of a loop on the consumption appliance movable in one direction.

Self-supporting and supported link belts or chains have become known in the most diverse forms, for the guiding of cables. The supported link chains require sizable supporting and deflecting systems in the form of rollers, rails or the like. Apart from the space needed for this purpose, the installation work is also costly.

Owing to their many moving parts, the self-supporting link chains are exposed to relatively great attrition and in view of their considerable mass, they have low traverse speeds. A particular disadvantage of the self-supporting link chains is that the links tend to open and close in pincer-like manner at the displaceable deflection point, so that accidents can be caused by pinching.

To eliminate these shortcomings, it has already been proposed that spring steel or plastic tapes or strips be employed for guiding the cables, instead of self-supporting or supported link chains. In such arrangements the cables are fastened on a steel spring strip side by side, the free extremity of the strip being fastened with formation of a semi-circular loop on a carriage or a machine tool saddle. The other extremity of the steel spring strip is arranged on a fixed part of the machine.

In view of the lack of rigidity of the steel spring or plastic strips, these are unsuitable in most cases as self-supporting devices for the guiding of flexible cables. Since the load due to the weight of the cables varies continually during the displacement of the consuming mechanism, it is not possible to obtain precise radii of curvature with these structures, and their use is restricted to short feed paths.

Supporting devices comprising holders, grippers, carrying rails, rollers and stops, developed for longer feed paths, are very costly and for their part limit the speed of traverse.

The invention is intended to provide a device for guiding flexible cables, hoses and the like, which carries and guides them in self-supporting manner, without guiding rails, which does not have any moving parts such as rollers, chain links, stops, grippers, or holders, for example, and is thus practically exempt of attrition. It has a smaller mass, so that high speeds of traverse are possible.

In accordance with the invention there is provided a support device for running at least one flexible elongate member from a fixed station to a station movable with respect to the fixed station and along a predetermined line, the device providing an open-ended loop region between the fixed and movable stations and including a guide strip defining a path for the member and whose relaxed cross-section has a curved profile to provide longitudinal stiffening but which is elastically deformable to assume a flattened cross-section in the loop region.

The elongate member may be an electrical cable, a pipe, or some similar type of object. Thanks to the curved profile of its cross-section, the guide strip has great bending strength in its longitudinal direction. In the area of the bend however, in which the outline is pushed in, the rigidity of the carrying strip is considerably lower. The preferably semi-circular loop thus links those portions of the guide strip which retain the curved profile. If one of these portions is now moved parallel to the other, the loop runs at half the speed and in the same direction, retaining the original loop radius. The radius of the loop depends on the size of the gauge of the carrying strip and on the nature of the cross-sectional shape. In such displacement, the cross-sectional shape of the part of the guide strip reaching the loop is pushed out flat. Because of the elasticity of the material of the guide strip, the portions displaced into the other rectilinear run of the carrying strip regain their curved profile.

The stiffening curved profile in cross-section is preferably arcuate so that the cables or the like may be situated within the convexity of the strip. The guide strip has one extremity fastened at a fixed station, such as a stationary part of a machine, and has its other extremity arranged on a movable station or part of the machine. Since the radius of curvature of the semi-circular loop depends on the guage of the guide strip and on the configuration of the arcuate cross-section, the radius of curvature of the loop can be varied within wide limits by varying the radius of the arcuate cross-section.

The major part of the weight of the cable is borne by the terminal fastenings of the guide strip at the stationary station and at the displaceable station. The lesser part of the weight of the cable is supported by the preferably semi-circular loop of the guide strip, which is prestressed by its cross-sectional form, and which provides considerable resistance to further flattening.

For fastening the cables or the like on the guide strip, elastic securing bands encircling the guide strip and the cables may be incorporated at intervals.

THe fastening may alternatively be produced by incorporating resilient clips spanning the member-receiving position and clasping the outer side regions of the guide strip at longitudinal intervals, carrying distance pieces extending towards the guide strip at either side of the member-receiving position.

The fastening of the cables on the carrying strip may otherwise be by a springy strip of plane cross-sectional form with distance pieces situated at either side of the member-receiving position and secured on the guide strip by springs set at intervals and clipped on to the side regions of the guide strip.

To prevent displacement and piling up of several cables running parallel to each other, the cables may be fastened together with criss-cross windings of elastic bands.

To secure as omnilateral as possible a protection of the cables, an auxiliary guide strip having the oppositely directed profile curvature may be arranged over the guide strip so that the cables may be situated within the space formed between the strips. A system of this kind increases the load-carrying capacity of the device and offers protection against dust, heat, water splashes and so on.

Resilient seals may appropriately be incorporated at the longitudinal sides of at least one of the two guide strips in this form of device. Moreover, elastic securing bands may be arranged to encircle the strips at intervals, so as to hold them together.

The spacing of the two guide strips in the loop region may be chosen in such manner that a relative displacement occurs in the bend area between the seal and the opposed guide strip.

In another arrangement providing a closed device the concavity of the guide strip is covered by a plane auxiliary guide strip arranged along the guide strip and fastened to it laterally. The fastening of this auxiliary strip may be produced by means of longitudinally spaced elastic securing bands encircling the strip and the auxiliary strip. Resilient seals are preferably incorporated on the longitudinal sides of the elastic band.

To increase the rigidity of the guide strip, one or more additional carrying strips having the same transverse curvature may be incorporated along the guide strip and contiguous with it.

A drum may be arranged to run idle in the loop of the carrying strip. In case of great cable weight, extremely long open or closed guide strips may be relieved of load in this manner. With an arcuate transverse curvature of the strip, a drum of this kind may be encircled over a greater angle than 180°. This slight form-locking arrangement, and the simultaneous force-locking action, ensure that the drum is entrained by the semi-circular loop during the displacement of the guide strip.

The resilient seals arranged on the longitudinal sides of at least one of the guide strips may have a partly oval outline with a plane longitudinal side, the height of the oval section corresponds to at least the spacing of the guide strips within the loop. Sliding of the seals in constant contact with the opposed guide strip is thus produced during a displacement of the strips relative to each other, in the longitudinal as well as in the transverse direction. Moreover, the internal space between the strips remains extensively sealed, even in the loop.

Both guide strips may have arranged on their longitudinal sides resilient seals in the form of grooves and tongues engaging in each other in form-locked manner. Seals of this form allow displacement in the longitudinal direction and deflection in transverse direction, a satisfactory sealing effect being secured at the same time in the loop.

The seals may be glued or bonded on to the longitudinal sides of the carrying strips.

The edges of the guide strips may have masks of elastic material, U-shaped and enflanking the edges. This measure reduces the risk of accidents.

Provision may be made for the U-shaped marginal covers to be formed in one piece with the resilient seals. In this way, the seals may be secured on the guide strips by a clamping action, the sharp outline edges of the strips being covered at the same time.

The elastic material of the seals or marginal covers may consist of oilproof sponge rubber or of oilproof cellular rubber.

It has been found that the thickness of the carrying strips cannot be optional since breakages occur under continuous load if the gauge of the carrying strips is relatively great compared to the radius of the loop. For elimination of this disadvantage, the guide strips may consist of several individual strips having the same profile form and arranged one on another, contiguously. By this measure, it is possible to increase the thickness of the carrying strips, thus increasing the load-carrying capacity, while the stresses occurring in the individual carrying strips remain relatively low.

The profile of the guide strips may be undulant as seen in cross-section. The opposed longitudinal edges of the strips may be convergent. The undulant profile form offers a lesser intrinsic stress, for a prescribed radius of curvature in the semi-circular loop and for a prescribed thickness of material, compared to a carrying strip of arcuate profile form.

The cables, hoses or the like guided in the device should be exposed to the lowest possible compressive and tensile stresses. If several cables are arranged beside each other in the internal space formed by two profiled carrying strips, these cables are in each case stretched or contracted if they are not situated in the neutral plane which extends at the middle of the gap between the guide strips in the loop. Accordingly, distance pieces may be arranged in the space between the strips for the cables in such manner that the centre of the cables is positioned at the middle of the gap, or neutral area, of the strips in the loop.

The distance pieces may consist of spacers of elastic material of identical height and oppositely arranged on the carrying strips within the internal space, the height of the spacers being matched to the cable diameter in question.

The spacers may alternatively be arranged in continuous manner along the guide strips. The spacers are suitably fixed on the strips by means of a glued joint.

Provision may also be made for the distance pieces to consist of narrow spacing elements situated between the individual cables and connected to them by bands, and for the spacing elements to project uniformly over the cable periphery at either side and transversely to the length of the cables. These spacing elements, which are of a plastic material, may consist of rings, discs or plates.

Provision may also be made for the distance pieces to consist of essentially rectangular plates forming webs of transverse width corresponding to the spacing of the guide strips in the loop, and for the cables to be inserted in bores on a central or median line of the webs.

These webs may be composed of identical halves held together at their ends by clips.

To provide a guiding effect, the individual webs may be interconnected by spring steel wires extending in the longitudinal direction of the cables and laterally arranged on the webs. These spring steel wires maintain the distances between the individual webs. Spring steel wires may be situated in the middle of the webs, so that the spring steel wires are situated in the neutral plane in the semi-circular loop. The edges of the webs may be rounded off, so that a relative displacement of the webs with respect to the carrying strips is possible.

Sealing strips of an elastic material may be fixed uninterruptedly on the lateral edges of the webs in the longitudinal direction of the cables, the width of the sealing strips corresponding to at least the spacing of the guide strips in the loop.

The cable "cage" consisting of the webs interconnected by the spring steel wires and contingently the sealing strips, are preferably fastened only to the fixed station and to the displaceable station. Because of this "cable cage" consisting of the webs and spring steel bands, the cables are always guided in the neutral area, and the tensile and compressive stresses of the cables in the loop are reduced.

The carrying strips may be arranged on receiving elements matching the profile of the guide strips and arranged on the fixed station and on the displaceable station. The receiving elements or receptors may for example consist of clamping jaws corresponding to the profile of the guide strips. Considerable rigidity of the device as a whole is accomplished by the strips.

IN THE DRAWINGS

The invention will now be described in more detail, by way of examples only with reference to the accompanying diagrammatic drawings, in which.

Figure 1:
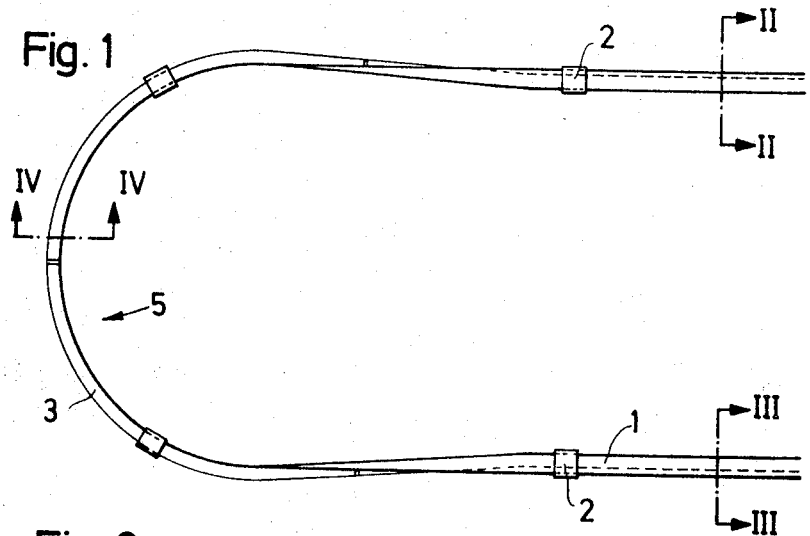
FIG. 1 is a side view of an open form of cable support.
Figure 5:
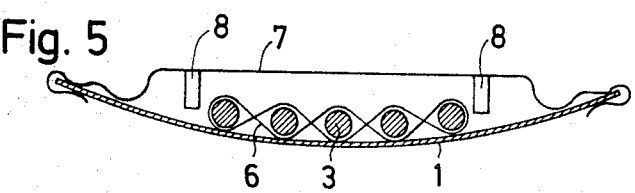
Figure 6:
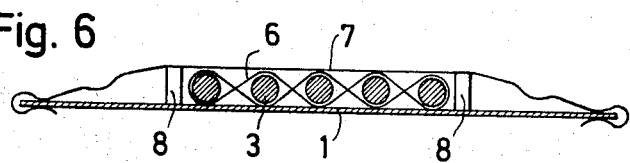
Figure 11:
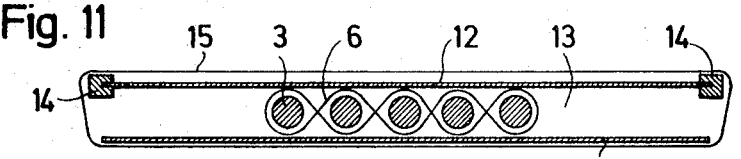
Figure 12:
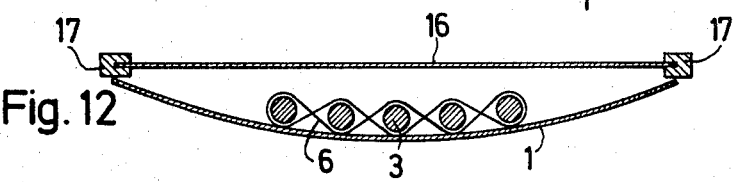
Figure 13:
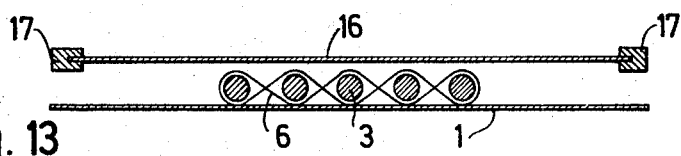
Figure 14:
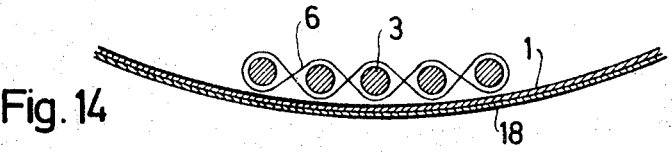
Figure 15:
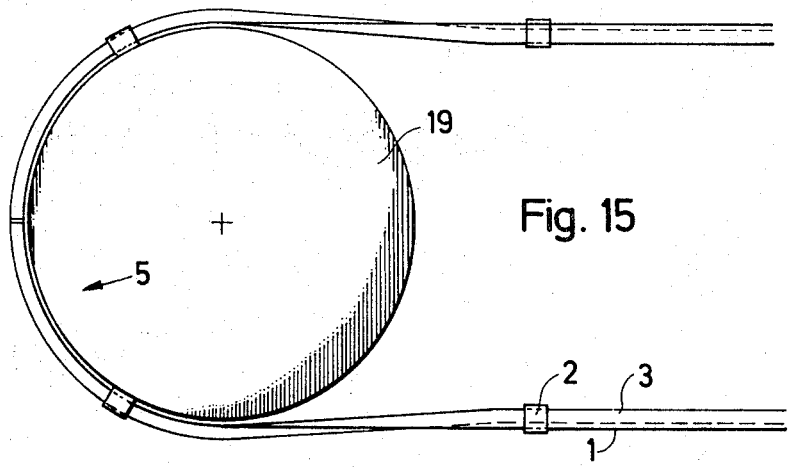
Figure 16:
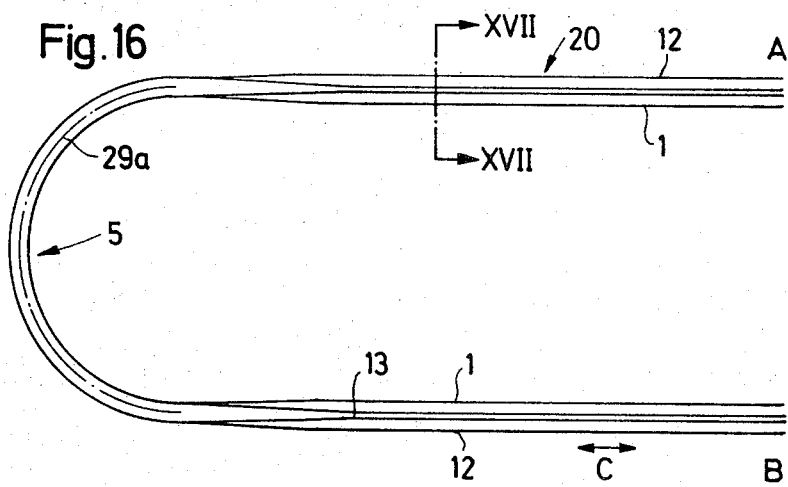
Figure 17:
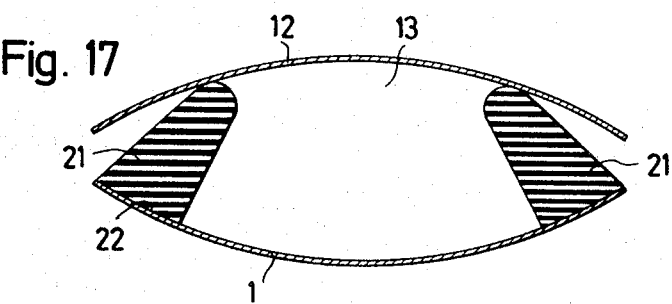
Figure 18:
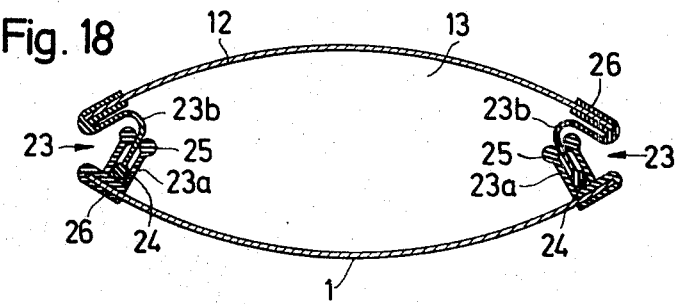
Figure 19:
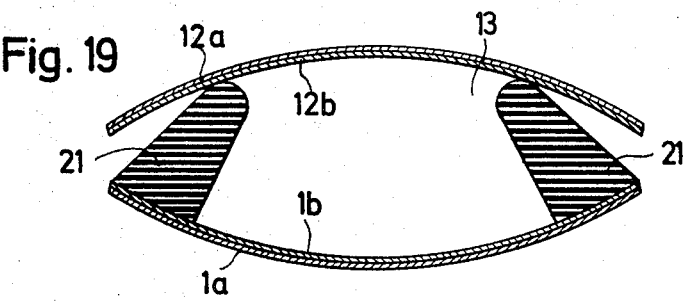
Figure 20:
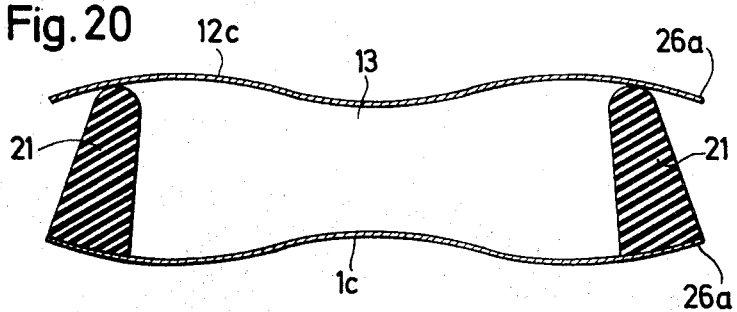
Figure 21:
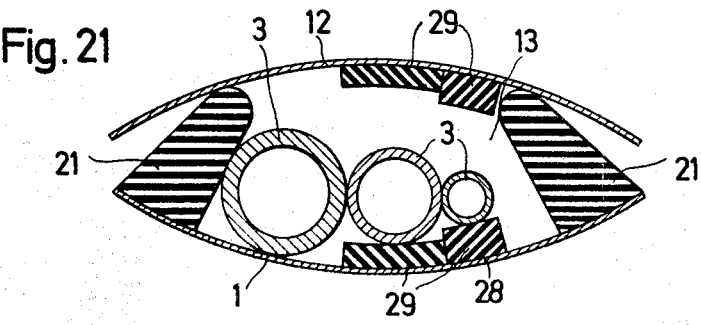
Figure 24:
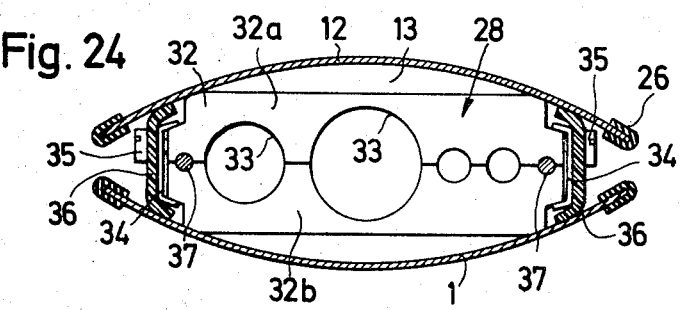
Figure 25:
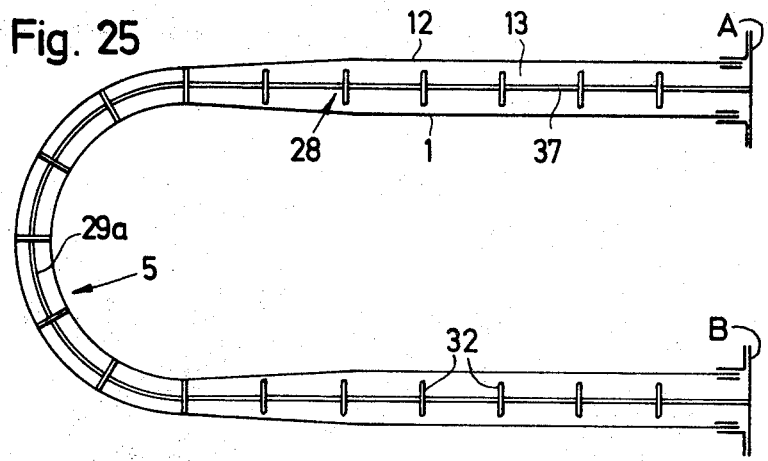
Figure 26:
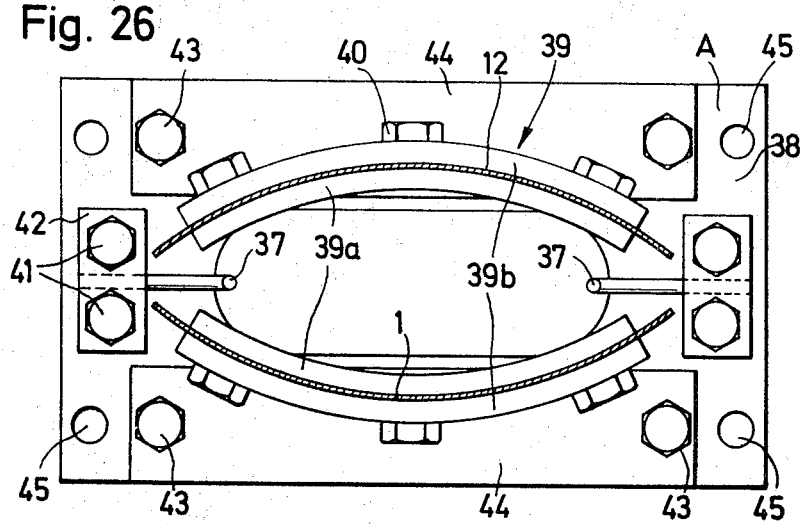

FIG. 5 is a section on the line II—II in FIG. 1 with one form of fastening system, FIG. 6 is a section on the line IV—IV in FIG. 1 with the fastening system shown in FIG. 5, FIG. 7 is a section on the line II—II in FIG. 1 with another form of fastening system, FIG. 8 is a section on the line IV—IV in FIG. 1 with the fastening system shown in FIG. 7, FIG. 9 is a side view of a closed form of device, FIG. 10 is a section on the line X—X in FIG. 9, FIG. 11 is a section on the line XI—XI in FIG. 9, FIG. 12 is a sectioned view of a cable support in another closed form, FIG. 13 is a section through the support of FIG. 12, in the bend region, FIG. 14 is a cross-section through an arrangement comprising two carrying strips of identical profile, FIG. 15 shows a supporting drum situated in a loop of the carrying strip, FIG. 16 is a schematic side view of another form of cable, FIG. 17 is a section on the line XVII—XVII in FIG. 16, FIG. 18 is a section corresponding to FIG. 17 for another arrangement, FIG. 19 is a section corresponding to FIG. 17 for a further arrangement, FIG. 20 is a section corresponding to FIG. 17 for another arrangement, FIG. 21 is a section corresponding to FIG. 17, showing some cables and spacers, FIG. 22 is a plan view of the cables with spacers consisting of narrow spacing elements, FIG. 23 is a section on the line XXIII—XXIII in FIG. 22, FIG. 24 is another form of device, in section FIG. 25 is a side view in longitudinal section of another arrangement, FIG. 26 is a plan view of a system for fastening carrying strips on a stationary point of connection.

DESCRIPTION OF THE PREFERRED EMBODIMENTS

Referring to FIGS. 1 to 4, cables 3 held with closed elastic securing bands 2 on the profiled guide strip 1 are run to a consuming system (not shown), which is displaceable in one direction, from a fixed point (also not shown). This may consist of the support of a machine tool, or the crab or trolley of a crane system, for example.

Figure 2:
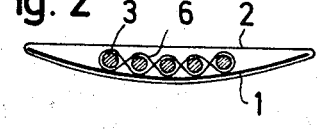
FIG. 2 is a section on the line II—II in FIG. 1.
Figure 3:
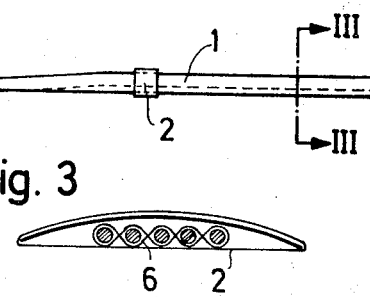
FIG. 3 is a section on the line III—III in FIG. 1.
Figure 4:
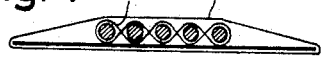
FIG. 4 is a section on the line IV—IV in FIG. 1.

The strip 1 has an arcuate profile in cross section, the cables 3 being situated in its concavity, as seen clearly in FIGS. 2 and 3. In an approximately semi-circular portion of a loop 5 formed by the carrying strip, the arcuate profile form is pushed out flat, as is apparent from FIG. 4. The cables 3 situated in the concavity of the strip 1 are held together with elastic bands 6, wound in criss-cross manner.

Another form of fastening is shown in FIG. 5. Clips 7 are arranged at intervals, and each has distance pieces 8 directed against the carrying strip 1 at either side of the cables 3. Edge portions of the clips slip over outer side portions of the strip 1. As apparent from FIG. 6, these distance pieces 8 space the clips 7 from the strip 1 in the bend region 5.

FIG. 7 shows another method of fastening the cables 3 in which a springy strap 9 of plane profile in cross section is arranged over the concavity of the carrying strip 1. The springy strap 9 is fastened to the strip 1 by springs 10 having end portions clipped over outer side portions of the carrying strip 1. Distance pieces 11 are disposed on the springy strap 9, and space it from the strip 1 in the bend region 5, as seen in FIG. 8.

FIGS. 9 to 11 show a closed form of cable support device. An auxiliary guide strip 12 having a profile with curvature oppositely directed to that of the strip 1, is arranged over the strip 1. The cables 3 are situated within the space 13 between the carrying strips 1 and 12. Resilient seals 14 produce a lateral sealing effect in the portions of the carrying strips 1 and 12 extending outside the region of bending 5, and are mounted on the longitudinal sides of the carrying strip 12. The seals 14 are lifted off the carrying strip 1 in the bend 5 region as shown in FIG. 11. The size of the seals 14 and the spacing of the strips 1 and 12 in the bend region 5 may be so chosen that the seals 14 slide on the strip 1 in this region 5 and a satisfactory seal is assured in this region. Elastic securing bands 15 encircling the carrying strips 1 and 12 are arranged at intervals along the strips.

FIGS. 12 and 13 show another form of closed device. The strip 1 is covered by a plane, elastic auxiliary strip 16 arranged along the strip 1, and its longitudinal edges carry seals 17 which bear against the outer edges of the strip 1 in the portions of the carrying strip outside the bending region 5 to form a closed space between the strip 1 and the strip 16. In the bend region 5, the seals 17 lift off the strip 1 as shown in FIG. 13. By appropriate selection of the profile of the strip 1 and of the dimensions of the seals 17, the seals 17 may slide on the strip 1 in the bend region 5 so that a satisfactory sealing effect is secured in this region. The elastic strip 16 and the strip 1 may be encircled by elastic securing bands (not shown) arranged at longitudinal intervals.

FIG. 14 shows another open device. In this case, a further strip 18 having a profile curvature corresponding to the curvature of the strip 1, is placed against the strip 1. The rigidity outside the bending region 5 is greater than the rigidity of a single strip.

In all the examples of embodiment so far described, the major portion of the weight of the cables 3 is carried by the fastenings (not shown) at the fixed point and displaceable station. The lesser portion of the weight of the cables 3 is supported by the loop, prestressed by the profiling of the guide strip or strips, which provides considerable resistance against further constriction.

To ensure that the bend portion 5 is relieved of load in an extremely long system, provision may be made as shown in FIG. 15, for a drum 19 to be arranged loosely in the bend portion 5. By virtue of the part-circular transverse profile of the strip 1, the strip is slung with its bend portion 5 around the drum 19 over an angle exceeding 180°. Thanks to this form-locking action, as well as to the force-locking effect simultaneously engendered by the weight of the cables 3, the drum 18 is mandatorily held in the bend portion 5 and entrained in both possible directions during displacement of the movable element.

Referring to FIG. 16, in another form of device cables, hoses or the like are led from a stationary connector (not shown) to a consuming system reciprocatingly displaceable in one direction, by means of a carrying element consisting of a material of high elasticity and strength, preferably being spring steel or a plastic material. The fixed point of connection is situated at A for example, whereas the displaceable consuming element may be situated at B. The carrying element 20 has a bend region or loop 5. The displaceable consuming element at B is displaceable in the direction of the arrow C.

The carrying element 20 consists of two superposed guide strips 1 and 12 having a stiffening transverse profile. As shown in FIGS. 2,3,4,6, and 9, this transverse profile is arcuate. As shown in FIG. 20, the profile of the carrying strips may alternatively be undulant in cross-section. The profile curvatures of the strips 1 and 12 are oppositely directed, so that a space 13 is formed between them. The cables, hoses or the like to be guided are situated within this sapce 13. The profile of the strips 1 and 12 becomes plane in the loop region 5.

As shown in FIG. 17, seals 21 of elastic material, for example of oilproof sponge rubber or oilproof cellular rubber, are arranged, facing the space 13, along the edges of the strip 1. The seals 21 have a partly oval profile with one plane longitudinal side face 22 glued on the carrying strip 1. The height of the seal 21 corresponds to at least the distance between the strips 1 and 12 within the loop region 5. Since the strips 1 and 12 have a plane transverse profile in the loop region 5, and the seals 21 consist of elastic material, the seals rise within the loop 5. Owing to the different speeds of the strips 1 and 12 within the loop 5, a relative displacement occurs between them. Since the seals 21 are not secured on the strip 12, however, relative displacement is possible without major straining of the seals 21 and without loss of the sealing action. The same applies if the strips 1 and 12 perform a relative displacement transversely to their longitudinal direction.

In the arrangement shown in FIG. 18, the strips 1 and 12 have elastic seals 23 arranged on their edges. These seals are formed as grooves and tongues which engage in each other in form-locked manner. The seals 23 consist of a groove part 23a and a tongue-like part 23b. The parts 23a and 23b, which extend along the entire length of the system, have enlargements 24 and 25 on their extremities, which prevent the parts from slipping out of each other accidentally. The seal parts are formed with integral U-shaped edge masks 26. The fastening of the seals 23 may accordingly be performed by plugging on to the edges of the carrying strips 1 and 12. Provision may also be made, as shown in FIG. 24, in case the seal is of different nature, for the edges of the strips to be equipped independently with U-shaped covers 26 of elastic material. This masks the sharp edges of the carrying strips, which otherwise represent an accident risk.

In the arrangement shown in FIG. 19, the strips 1 and 12 each consist of individual carrying strip elements 1a, 1b and 12a, 12b of the same profile and which are arranged one on the other. The stresses on the strips, occurring in the loop region 5 in particular, are thus considerably reduced as compared to a single strip of double thickness.

In the arrangement shown in FIG. 20, the strips 1c and 12c are undulant in cross-section, the opposed longitudinal edges 26a of the carrying strips being convergent in each case. Compared to the arcuate profile, this profile has the advantage of a lesser intrinsic stress for the same radius of curvature in the semi-circular loop region 5 and for the same thickness of material.

Referring to FIG. 21, in the arrangement shown in FIG. 19, spacers 28 may be placed in the space 13 when cables or hoses of varying size are carried in the same run. The spacers 28 ensure that the cables 3 arranged in the internal space 13 are always positioned at the middle of the gap between the carrying strips 1 and 12, in the neutral region in the loop 5, shown at 29a in FIG. 16.

The spacers 28 consist of distance pieces 29 arranged in opposed pairs in each of which the two pieces have the same thickness. The height of each distance piece 29 is matched to the diameter of the corresponding cable 3. No distance pieces are provided for the cable having the greatest diameter, since this is already positioned in the neutral plane within the loop 5 and does not undergo any compressive or tensile stresses. Thanks to the distance pieces 29, the cables 3 of smaller diameter are also brought into the neutral region within the loop 5, so that these cables are not exposed either to any tensile or compressive stresses owing to the different speeds of the carrying strips 1 and 12 within the loop 5. The distance pieces 29 may either be arranged without interruption throughout the length of the strips 1 and 12, or the distance pieces 29 may be formed as individual elements which are longitudinally spaced.

In the arrangement shown in FIGS. 22 and 23, the spacers consist of narrow spacing elements 31 arranged between the individual cables and joined to these by means of bands 30. The spacing elements 31, which are appropriately made of a plastic material and may consist of rings, discs or plates, project equally and ambilaterally beyond the cable periphery, transversely to the longitudinal extension of the cables 3. The spacing elements 31 bear on the strips 1 and 12 (not shown) whilst within the loop 5, with the result that the cables 3 are always positioned in the neutral region 29a.

In FIGS. 24 and 25 is shown an arrangement in which the spacers 28 consist of webs 32 arranged at longitudinal intervals. Thsee webs 32 consist of essentially rectangular plates having rounded edges and have a transverse width which corresponds to the gap between the carrying strips 1 and 12 within the loop 5. Bores 33 which receive the cables 3 are formed on the longitudinal median line of the webs 32. The diameter of the bores 33 is chosen a little greater than the external diameter of the cables 3 received by these bores. As seen from FIG. 25, the cables are thus always guided in the neutral region 29a within the loop 5.

The webs 32 may consist of "mirror-image" half-portions 32a and 32b which are held together at the ends by clips 34 secured with screws 35. The screws 35 simultaneously secure sealing strips 36 which are arranged along the entire length of the system, and whose width corresponds to at least the spacing between the strips 12 and 1 within the loop 5. The individual webs 32 are interconnected by spring steel wires 37 laterally fixed on these and running in the longitudinal direction of the cables 3. Spring steel wires 37 are also situated at the longitudinal middle of the webs 32, so that they are equally positioned in the neutral region 29a within the loop 5. The spring steel wires 37 are fastened only at the stationary point of connection at A and to the displaceable element at B. A so-called "cable-cage" is formed in this manner, which essentially consists of the spring steel wires 37, the webs 32 and the sealing strip 36.

The arrangement shown in FIG. 26 shows the fastening of the strips 1 and 12 on the fixed point of connection at A. The fastening to the displaceable element at B is carried out in the same manner. Receiving elements 39 in the form of clamping jaws, whereof the configuration corresponds to the profile form of the carrying strips 1 and 12, are arranged on a baseplate 38. Accordingly, the guide strips can be clamped in the receiving elements 39 and secured against slipping out by means of screws 40. The spring steel wires 37 are held on the baseplate 38 by a clamping plate 42 fastened by screws 41. External receiving elements 39a are firmly joined to flanges 44. The fastening of the receiving elements 39a and 39b on the baseplate 38 is performed by screws 43. The baseplate 38 has bores 45 for fastening the arrangement at the point required.

I claim:

1. A support device for running at least one flexible elongate member from a fixed station to a linearly movable station that travels along a predetermined line, the device providing an open-ended loop region between the fixed and movable stations and including a pair of spaced-apart, parallel guide strips disposed on opposite sides of said member, at least one of said guide strips having an arcuate profile in cross section, which provides longitudinal stiffness to support the weight of said member, but which is elastically deformable to assume a flattened cross section in the loop region, sadi strips cooperating to form a conduit-like enclosure for said flexible member which is wider at the midportion of the strips than at the edges thereof when said strips extend in a straight line, and said enclosure changing to parallel flat sides where it bends around said open-ended loop region, and elastic means flexibly holding said strips together.

2. A device as in claim 1, wherein said elastic means comprises elastic bands encircling said guide strips at intervals along their length so as to retain the member in the member-receiving position.

3. A device as in claim 1, including elastic seal elements fixed to the edges of at least one of the guide strips and extending along the length thereof, said seal elements contacting the other strip on either side of said flexible members at least along that portion of the device that is straight.

4. A device as in claim 3, wherein the spacing between the strips is such that a relative displacement of the strips occurs in the loop region.

5. A device as in claim 3, wherein the seal elements are of an oil-proof rubber.

6. A device as in claim 3, wherein the seal elements are of an oil-proof cellular rubber.

7. A device as in claim 1, wherein each of said guide strips has an arcuate profile in cross section, said strips having their respective concave sides facing one another so that the cross section of said conduit-like enclosure is lenticular in configuration when said strips extend in a straight line, both of said strips being flattened and extending parallel to one another where they bend around said open-ended loop region.

* * * * *